Feb. 26, 1952     L. B. S. WARD     2,587,553
BEAN PICKER

Filed Feb. 12, 1948     10 Sheets-Sheet 1

LEILA B.S. WARD
INVENTOR

BY
*Theodore E. Simonton*
ATTORNEY

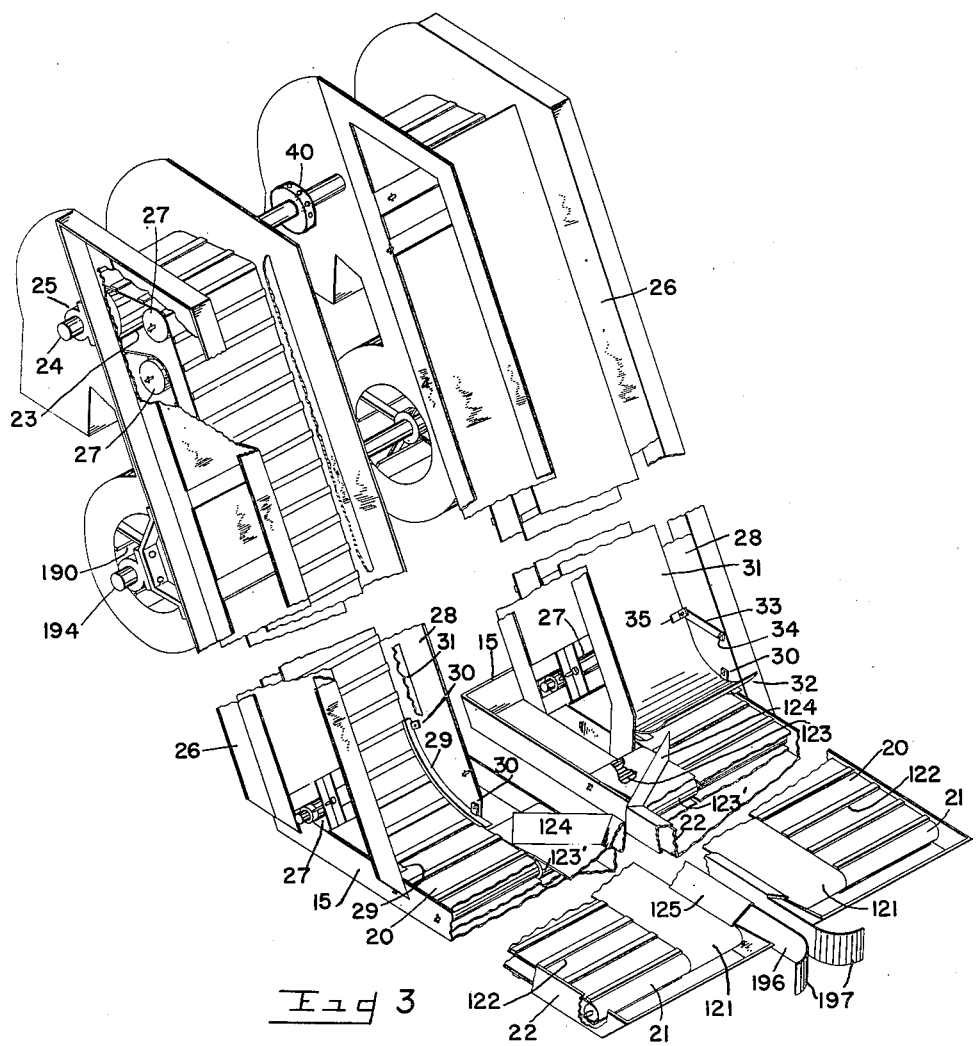

Feb. 26, 1952 L. B. S. WARD 2,587,553
BEAN PICKER
Filed Feb. 12, 1948 10 Sheets-Sheet 4
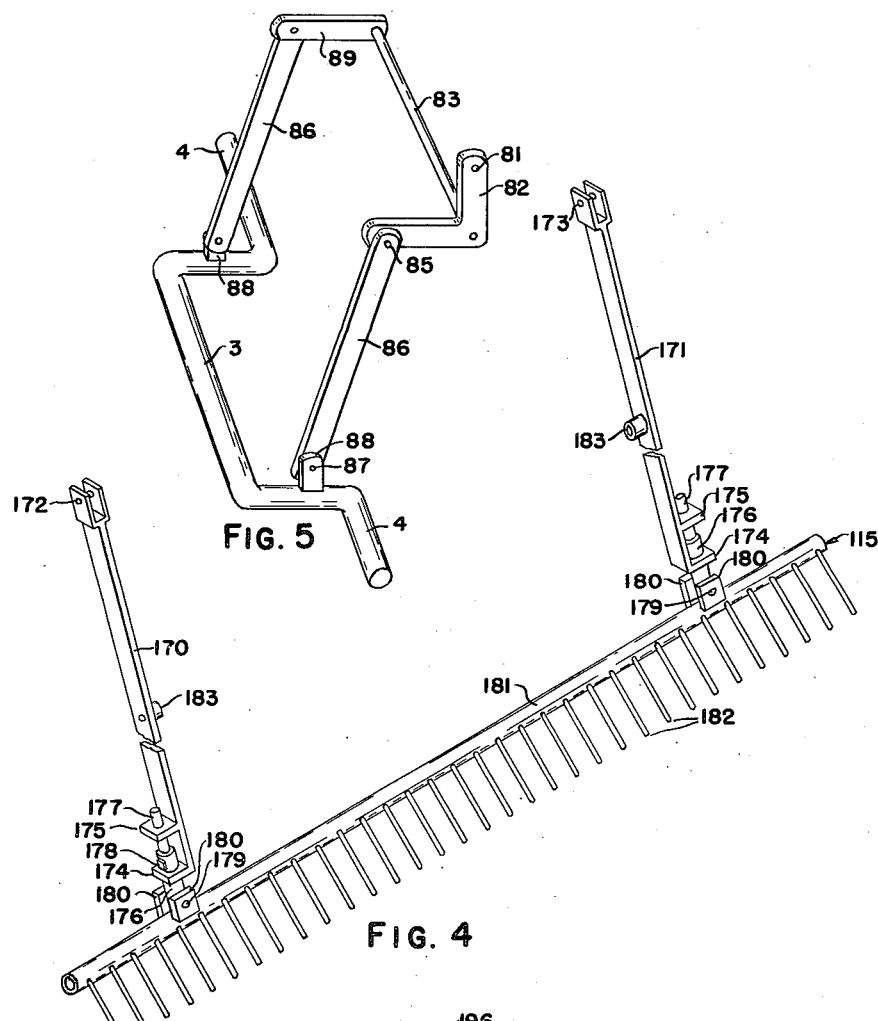
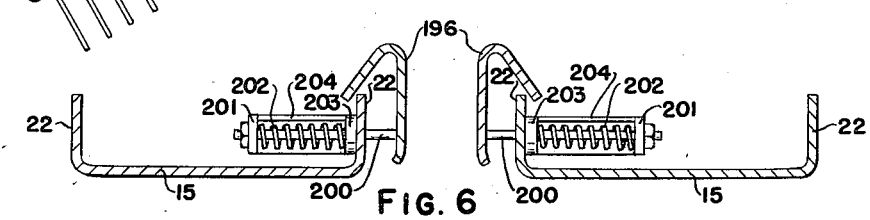
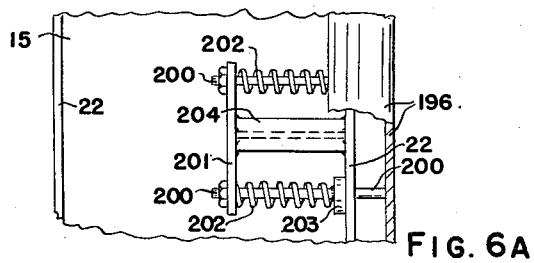
LEILA B. S. WARD
INVENTOR

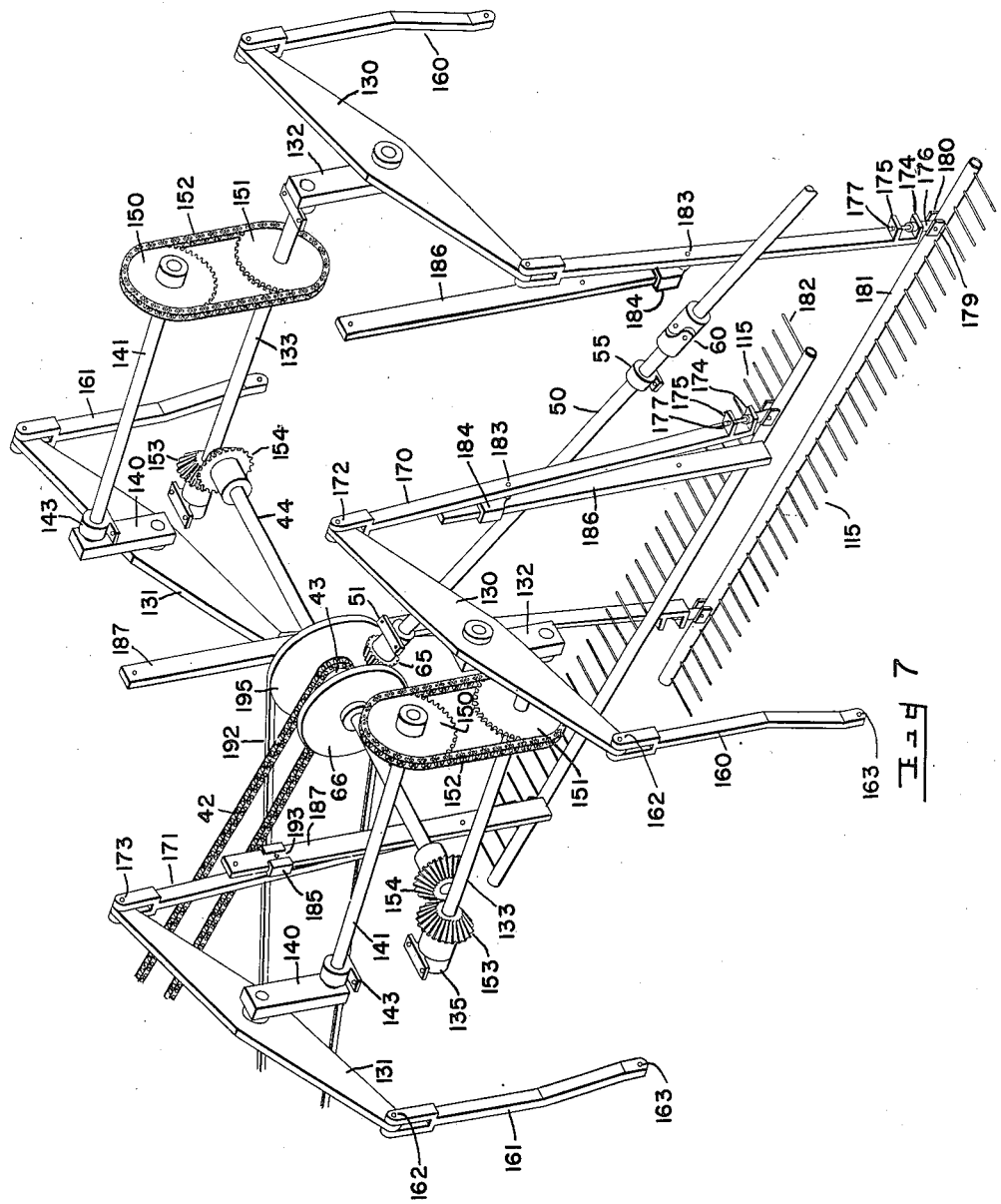

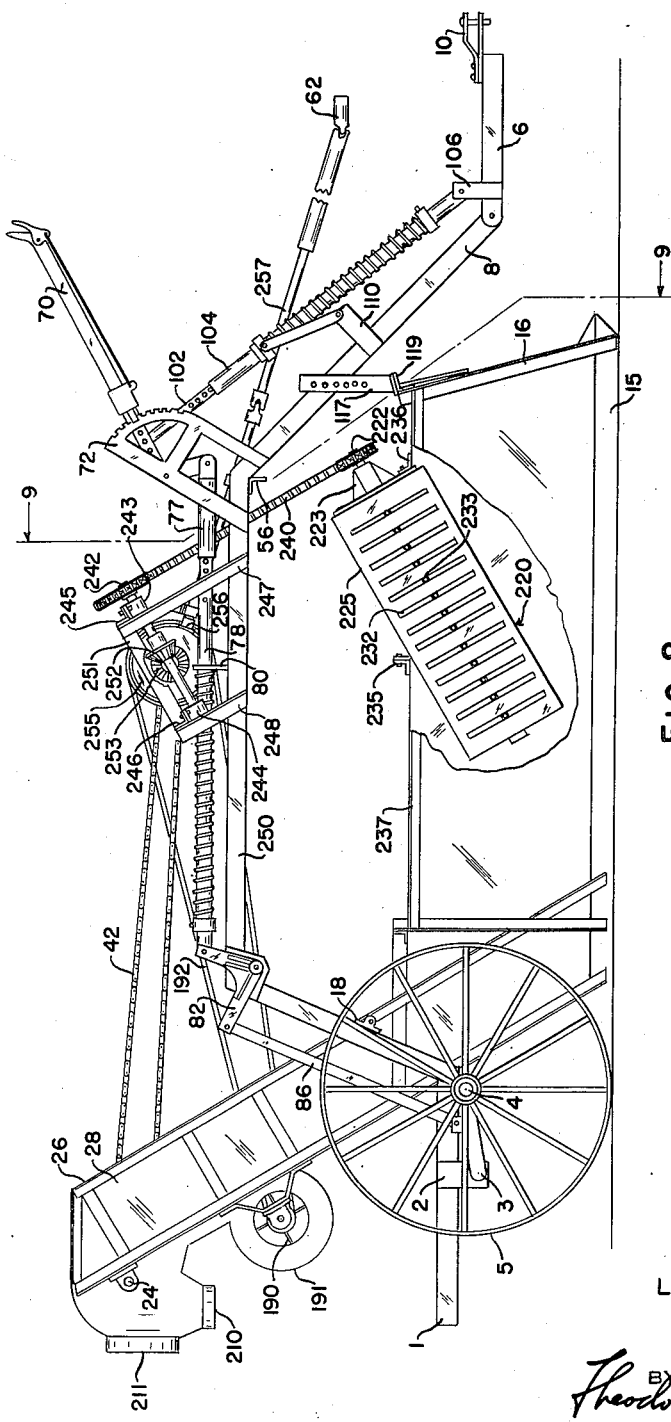

Feb. 26, 1952 L. B. S. WARD 2,587,553
BEAN PICKER
Filed Feb. 12, 1948 10 Sheets-Sheet 7

LEILA B. S. WARD
INVENTOR

ATTORNEY

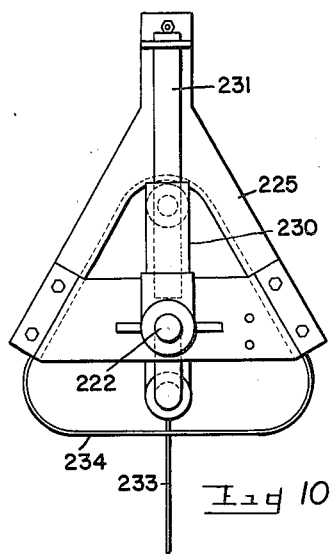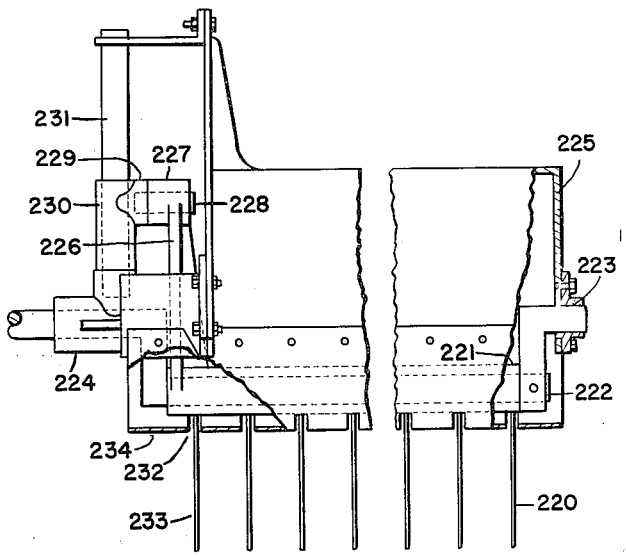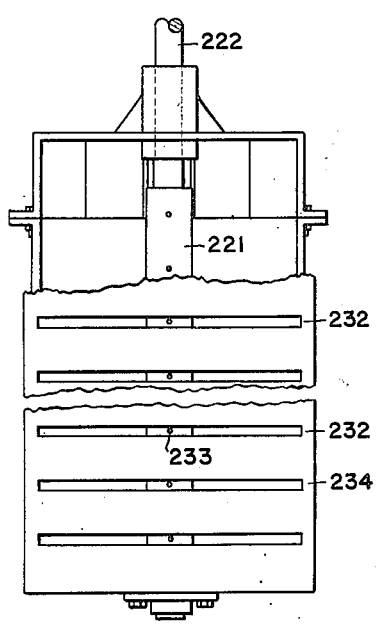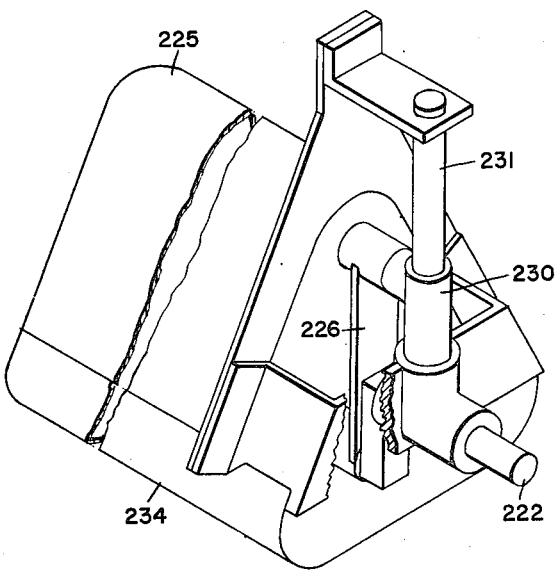

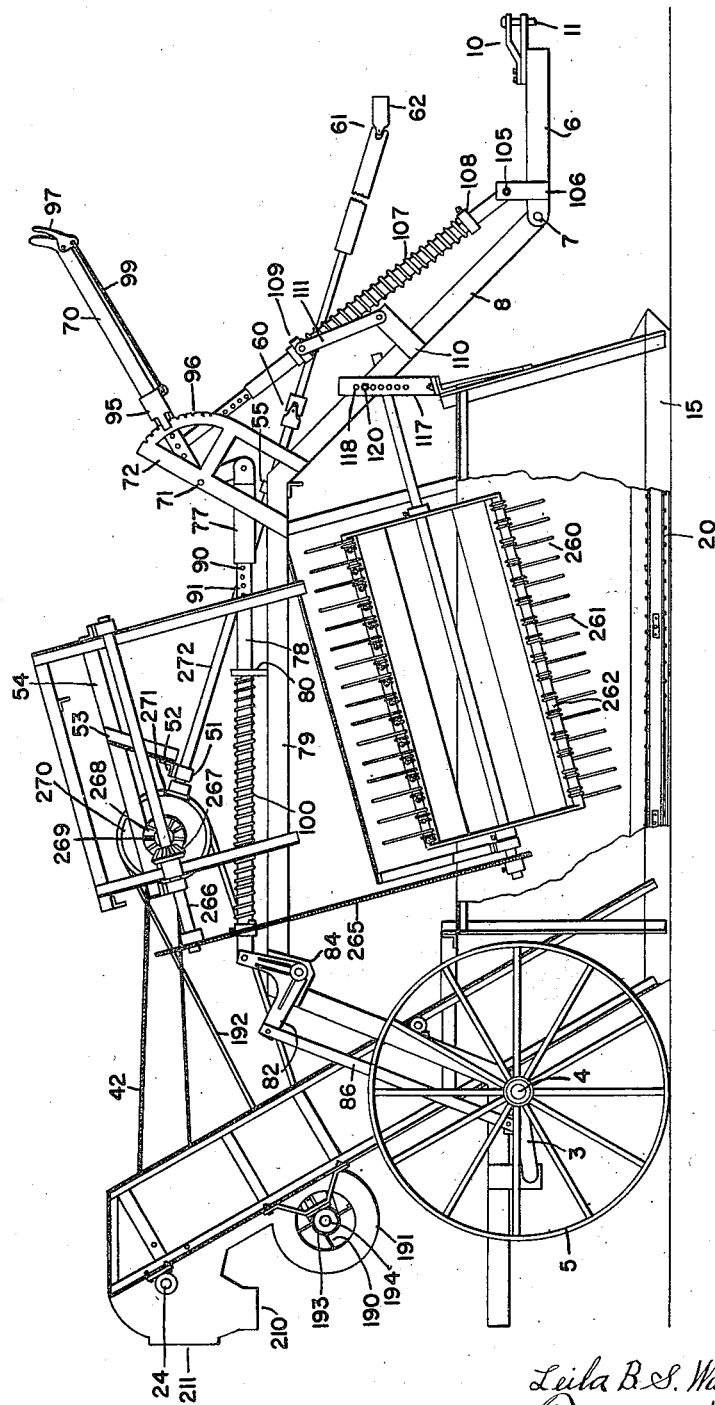

LEILA B.S. WARD
INVENTOR

Patented Feb. 26, 1952

2,587,553

UNITED STATES PATENT OFFICE 2,587,553

BEAN PICKER

Leila B. S. Ward, Vernon, N. Y., assignor to Ward Canning Company, Vernon, N. Y., a partnership Application February 12, 1948, Serial No. 7,830

6 Claims. (Cl. 56—130)

1

My invention relates to a bean picker and I declare the following to be a full, clear, concise and exact description thereof sufficient to enable anyone skilled in the art to which it appertains to make and use the same, reference being had to the accompanying drawings in which like characters refer to like parts throughout.

The object of the invention is to provide a machine that will pick bean pods from the growing vine. The machine embodies a carriage that can be drawn by a tractor through the rows of bean plants in the garden and will effectively pick the pods from the vines as it passes therealong.

The object will be understood by referring to the drawings in which:

Fig. 3 is a detail enlarged view, showing a perspective of the conveyor belts and immediate parts of the machine.

Fig. 4 is a detail enlarged view showing a perspective of a rake employed in the machine.

Fig. 5 is a detail enlarged view, showing a perspective of the crank axle and associated parts of the machine.

Fig. 6 is a detail enlarged sectional view taken on line 6—6 of Fig. 1, the conveyor belts being omitted for clarity.

Fig. 6A is a detail enlarged plan view of the parts shown at one side of Fig. 6, parts being broken away.

Fig. 7 is a detail enlarged view showing a perspective of certain yokes and immediate parts employed in the machine.

Fig. 8 shows a side elevation of a modified form of the bean picker, parts being broken away.

Fig. 10 is a detail enlarged view showing a front elevation of the rake illustrated in Figs. 8 and 9 and immediate parts.

Fig. 11 is a detail enlarged view showing a side elevation of Fig. 10, parts being in section and parts broken away.

Fig. 12 is a detail enlarged view showing a plan looking up from beneath of Fig. 10.

Fig. 13 is a detail enlarged view showing a perspective of Fig. 11, parts being broken away.

Fig. 14 is a side elevational view of a further modification of the machine.

2

Figure 1:
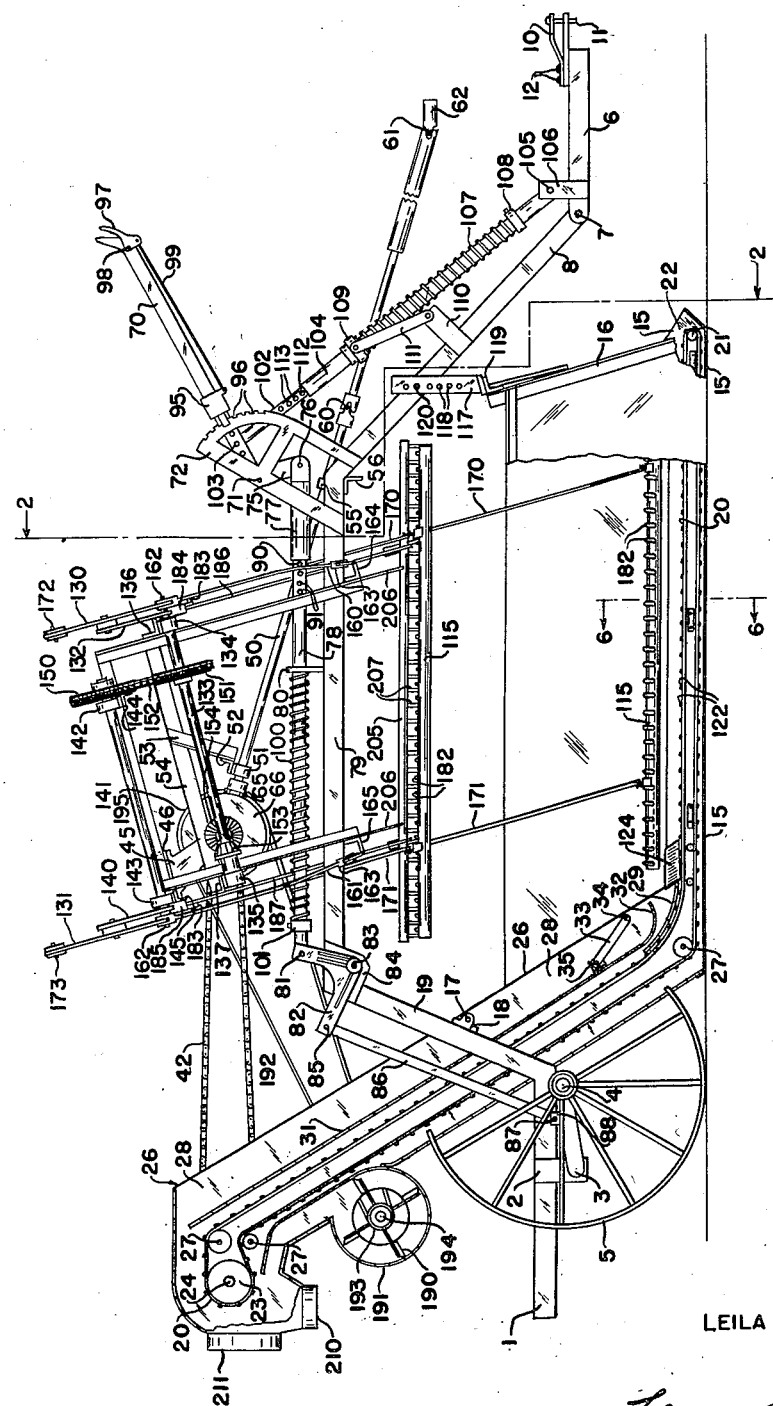
Fig. 1 is a side elevation of a bean picker according to this invention, parts being broken away.

Referring more particularly to Figs. 1 to 7 of the drawings, the machine embodies a frame 1 composed of angle irons and having depending bearing members 2 in which is journaled the offset portion of a crank axle 3 having ends 4, 4 forming journals on which wheels 5, 5 are mounted to turn. At the front end a link 6 is pivotally attached at 7 to the side bar 8 of frame 1. A clevis 10 provided with a pin 11 is bolted at 12, 12 to link 6, whereby the machine can be attached to a tractor, not shown.

Pans 15, 15 that normally contact the ground on either side of the vines are attached to frame 1 by a sub-frame comprising angle bars 16, 16 at the front end thereof and rear cross bar 17 pivotally carried in hanger bearings 18, 18 attached to bars 19, 19 of frame 1. A conveyor belt 20 is mounted in each of the pans 15, 15. Each of the belts 20 moves on a roller 21 in the front end. Roller 21 has bearings in the side walls 22, 22 of pans 15, 15. Belts 20 run parallel with the ground for a short distance, then upwards at an inclined angle at the rear end over roller 23 mounted to turn with shaft 24 having bearings in hangers 25, 25 fixed to the back wall of rear upwardly inclined chute 26. The lower part of each of the chutes 26, 26 rests in the rear part of pan 15.

Direction rollers 27, 27, 27 having bearings in side walls 28, 28 of chute 26 aid in holding the conveyor belts 20 at their required angle in their respective chutes 26, 26. There is employed for this purpose also narrow arcuate members 29, 29 supported at their opposite edges by lugs 30 riveted or welded to side walls 28, 28 of chute 26. A member consisting of an inclined flat sheet 31 having a curved lower end 32 is disposed in parallel relation to and spaced from conveyor belt 20 in each instance, whereby to hold the beans against the conveyor belts 20, 20. It is supported at one end by links 33, 33 pivoted at 34, 34 to the side walls 28, 28 of chute 26, and at the other pivoted to brackets 35, 35 welded to the top surface of sheet 31, whereby to allow for flexibility at this location.

The means for moving each of the conveyor belts 20, 20 is the same for each belt. It comprises a sprocket wheel 40 mounted to turn with shaft 24 mentioned above. A sprocket chain 42 connects sprocket 40 with sprocket 43 mounted to turn with shaft 44 supported cross wise of the machine in hanger brackets 45, 45 welded to overhead cross angle iron 46 of frame 1.

Shaft 44 is rotated by power shaft 50 carried in hanger bracket 51 welded to cross angle iron 52 that is welded in turn to depending angle irons 53, 53 at each end thereof. The upper ends of irons 53, 53 are welded to angle irons 54, 54 disposed at an inclined angle lengthwise of the machine. Bearing bracket 55 also supports power shaft 50 at about its middle part. It is welded or bolted to the center part of cross angle iron 56 of frame 1.

Power shaft 50 has a universal joint at 60 and one at 61. The lower link 62 of shaft 50 is connected to and rotated by the power take-off of the tractor, not shown. The upper end of power shaft 50 has mounted to turn therewith a bevel pinion 65 that meshes with a bevel gear 66 mounted to turn with shaft 44.

The means for elevating and lowering the rear of frame 1 relative to wheels 5, 5 contemplates a rock lever handle mechanism disposed on one side of the machine, hereinafter described.

It embodies a bell crank lever handle 70 pivoted at 71 to rack frame 72 welded to frame bar 8. The lower right angle part 75 of handle 70 is pivoted at 76 to the bifurcated end of sleeve 77 that provides a loose fit for the end of rod 78 which has a bearing in upstanding member 80 welded to the horizontal part 79 of frame bar 8.

The opposite end of rod 78 is pivoted at 81 to bell crank lever 82 fulcrumed on rod 83 projecting laterally from plate 84 welded to horizontal member 79 of frame 1. The opposite end of bell crank lever 82 is pivoted at 85 to link 86 which has its lower end pivoted at 87 to upstanding lug 88 welded to a crank arm of the crank axle 3. Rod 83 extends across the machine and has an arm 89 that rocks therewith. Arm 89 is pivoted to a like link 86 similarly connected to axle 3.

When the handle 70 is released, the weight of the frame 1 will cause the crank axle 3 to rotate so that its offset portion moves downward, thus lowering the rear end of the frame 1 with respect to the wheels 5. The degree to which the near end of frame 1 can be lowered, however, will be determined by adjustable pin 90 engaging one of the series of apertures 91 made in rod 78. The ends of pin 90 will project far enough from the surface of rod 78 to abut against the contiguous end surface of sleeve 77, which is pivoted at 76 to bell crank lever handle 70 as above mentioned and as hereinafter explained.

Handle 70 is fitted with a sliding dog 95 having a tooth that is adapted to engage any one of the series of notches 96 in rack 72. Dog 95 is actuated by handle lever 97 pivoted at 98 to handle 70. It is connected to dog 95 by link 99.

The means for cushioning the rear ends of the pans 15, 15 from the rough places in the ground contemplates a coiled spring 100 mounted on rod 78 between adjustable collar 101 and bearing member 80.

The means for elevating and lowering the front end of frame 1 relative to the ground embodies rod 102 pivoted at 103 to bell crank lever handle 70. The free end of rod 102 slides in sleeve 104 pivoted at 105 at its lower end to upstanding lug 106 welded to bar 6.

The means for cushioning the front ends of the pans 15, 15 embodies a coiled spring 107 disposed upon sleeve 104 between adjustable collar 108 and collar 109. The latter is mounted to slide on sleeve 104. Collar 109 is connected to upstanding lug 110 welded to the downward inclined part of side frame bar 8 by a link 111, whereby the shocks of pans 15, 15 will be absorbed by spring 107.

The means for limiting the downward movement of the front part of frame 1 embodies an adjustable pin 112 projected through one of a plurality of apertures 113 made in rod 102. It extends therebeyond on either side to engage the contiguous end of sleeve 104.

In order to prevent the machine from tearing the vines from the ground it is necessary to hold rakes 115, 115 at an inclined angle thereto, whereby the forward part of rakes 115, 115 will be higher from the ground than the rear part of rakes 115, 115. This will permit the forward part of rakes 115, 115 to contact the upper part of the vines and the rear part to contact the lower part of the vines as the machine approaches the same.

The means for tilting the sub-frame carrying pans 15 and chute 26 relative to frame 1 contemplates upstanding brackets 117, 117 on opposite sides of the pan sub-frame and each provided with a plurality of apertures 118, 118. Brackets 117, 117 are bolted or welded at their lower ends to cross angle iron 119 of the sub-frame. The upper ends of brackets 117, 117 lie adjacent the side bars 8, 8 of frame 1 and are detachably engaged therewith by adjustable pins 120, 120 inserted through the pre-determined apertures 118, 118 in brackets 117, 117 and into an aperture made in said bars 8, 8.

The means for picking the beans contemplates said rakes 115, 115 mentioned above mounted to move alternately in a elliptic and at an inclined angle towards the rear of the machine, whereby to rake the beans from the vines, first from one side and then the other. Moving in an elliptic will cause rakes 115, 115 to move inward to contact the vines, then upward to pull the pods off the vines and then let them fall upon the conveyor belts 121, 121 located on either side of the machine.

Belts 121, 121 lie adjacent belts 20, 20 and are not provided with cross slats, whereas belts 20, 20 are provided with slats 122, 122. Said belts 121, 121 travel upon the same front rollers 21, 21 as do belts 20, 20. At the rear, however, they travel on rollers 123, 123 having bearings in side walls 22, 22 of pans 15, 15 and are located near the center of pans 15, 15.

In order to have the surface of belts 121, 121 a little above the surface of belts 20 to allow the beans to move thereon the diameter of rollers 21, 21 and 123, 123 are larger at the end over which belts 121, 121 travel than the end where belts 20, 20 travel.

This will enable the pods of beans to move onto belts 20, 20 when they come in contact with the scrape-off members 124, 124 disposed at an angle to belts 121, 121.

The scrape-off members 124, 124 are welded or otherwise secured to and supported by inclined members 125, 125 that extend between the scrape-off members 124, 124 and the front of the machine to overlap belts 121, 121 to form an inclined plane for the pods to slide downward thereon and to close the gap between walls 22, 22 and conveyor belts 121, 121, whereby the pods cannot fall in between said walls 22, 22 and belts 121, 121. The inclined members 125, 125 may be formed integrally with or welded to the vertical guide walls 195, 196 hereinafter described.

The means for actuating rakes 115, 115 heretofore mentioned contemplates a pair of yokes 130, 131 for each of the rakes 115, 115. The forward yoke 130 of each set is mounted to turn freely on the bearing part of a crank arm 132 which has a tight fit to the reduced forward end of shaft 133 disposed on an incline downward towards the rear of the machine.

Shaft 133 has loose bearings in hanger straps 134, 135 welded to cross angle irons 136, 137 respectively, whereas the rear yoke 131 of each set is mounted to turn freely on the bearing part of crank arm 140 mounted to turn with shaft 141 located in the same plane above and parallel to shaft 133. Shaft 141 turns freely in bearing straps 142, 143 welded to cross angle irons 144 and 145 of frame 1 respectively.

The means for revolving each pair of shafts 133 and 141 in unison and in the same direction contemplates a sprocket wheel 150 mounted to turn with shaft 141, sprocket wheel 151 mounted to turn with shaft 133, and connecting sprocket chain 152. The lower shaft 133 of each set acts as the power shaft. To this end a bevel pinion 153 is mounted to turn with each of the shafts 133, 133 which lay parallel to and in the same plane to each other. Said pinions 153, 153 mesh with beveled pinions 154, 154 mounted on the ends of shaft 44, which is rotated by power shaft 50 as hereinabove described.

Each pair of the yokes 130, 131 of each set rocks not only on the bearing parts of crank arms 132, 140 but also because of the connection of crank arms 132, 140 to shafts 133, 141 to travel in a planetary motion about the ends of shafts 133, 141 as centers.

The means for causing rakes 115, 115 to travel in an elliptical path, whereby they will move inward from opposite sides towards the vines, then upward to rake the beans from the vines, and outward to clear the vines on their downward strokes embodies a pair of links 160, 161 hereinafter mentioned. Said links 160, 161 limit the rocking of each pair of yokes 130, 131 on said crank arms 132, 140. The bifurcated upper ends of each of the links 160, 161 is pivoted at 162 to one end of each of the yokes 130, 131 respectively, and the lower ends of each of the links 160, 161 is pivoted at 163 to each of the rigid cross angle irons 164 and 165 respectively of frame 1.

Furthermore, the elliptic movement of rakes 115, 115 contemplates a pair of links 170, 171 pivoted at their upper bifurcated ends at 172, 173 to the opposite free ends of yokes 130, 131. The lower ends of links 170, 171 are formed with horizontal outstanding shelves 174, 175 in each instance. Shelf 174 has an aperture for the upward projection therethrough of sleeve 176, whereas shelf 175 has an aperture for the upward projection of rod 177 having a sliding fit with sleeve 176 and held thereto by set bolt 178. The lower ends of each of the sleeves 176 is bored for the projection of a pin 179 having bearings in upstanding ears 180, 180 in each instance that are welded or otherwise secured to the tubular back part 181 of rake 115. Teeth 182 project laterally from tubular part 181 of rake 115.

Links 170, 171 are pivoted at 183 to grooved members 184, 185 that slide on depending bars 186, 186 in front and bars 187, 187 in the rear respectively. Each of the bars 186, 186 and 187, 187 are bolted or welded to cross angle irons 136 and 164 of frame 1 in the front and cross angle irons 165, 145 of frame 1 in the rear respectively.

As shown in Fig. 7, when the left hand set of crank arms 132, 140 rotates clockwise with shafts 133 and 141, carrying the left-hand yokes 130 and 131 therewith, said yokes 130, 131 will lower and move outwardly the left-hand rake 115, whereas the right-hand set of crank arms, which are in parallel relation to the left-hand set of crank arms as seen in Fig. 5 will rotate counter-clockwise with the right-hand shafts 133, 141 carrying the right-hand yokes 130, 131 therewith, and said yokes will move the right-hand rake 115 inward and upward to rake the bean pods off the vines.

It will be observed that each set of yokes 130, 131 have two independent motions. They will move with crank arms 132 and 140 in a planetary manner and also rock on the bearing parts of said crank arms.

The means for blowing foreign matter from the pods embodies a fan 10 mounted to revolve in a casing 11 attached to the rear end of chute 26 hereinabove mentioned. It is revolved by a V-belt 192 connecting pulley 193 on shaft 194 having bearings in casing 191 and V-pulley 195 mounted to turn with shaft 44.

The means for holding the vines as they are being combed by rakes 115, 115 contemplates yielding vertically disposed guide walls 196, 196, resiliently supported by the side walls 22, 22 of pans 15, 15 hereinabove mentioned. The front free ends 197, 197 of walls 196, 196 curve outwardly away from each other to allow for collecting the vines therebetween.

The means to allow walls 196, 196 to yield when contacting the vines, whereby to aid in preventing the vines from being pulled up, contemplates several spaced sets of pairs (seen at the bottom of Fig. 1) of rods 200, 200 mounted in bearings in walls 22, 22 of pans 15, 15.

As shown in Fig. 6, the inner ends of the rods 200 are welded or otherwise secured to the walls 196, and the outer ends of each pair of rods 200 are connected by a spacer plate 201 to which the rods are held by nuts threaded thereon. A coil spring 202 is mounted on each of the rods 200 between the spacer plate 201 and a stop collar 203 secured to rod 200, for example, by being threaded thereon or pinned thereto. A strut 204, T-shaped in section, is located between and parallel to each pair of rods 200, and has its ends welded to the sidewall 22 and the spacer plate 201. The assembly thus described is suspended within the pan 15 between the upper and lower reaches of the conveyor belts, and serves to resiliently support the guide walls 196 at a fixed minimum spacing, while permitting them to yield laterally outward when subjected to any undue pressure.

This means for separating the vines from rakes 115, 115 as they approach their high position contemplates strippers 205, 205 disposed in parallel relation and hung lengthwise of the machine by bars 206, 206 fastened to cross angle iron 164 in front and to cross angle iron 165 in the rear. Each of the strippers 205, 205 is provided with depending teeth 207 that are disposed to enter the interstices between teeth 182 of rakes 115, 115.

In operation the machine will be attached to a tractor, not shown, by means of clevis 10. The tractor will straddle the vines as it moves along the rows thereof and draw the machine therebehind.

Figure 2:
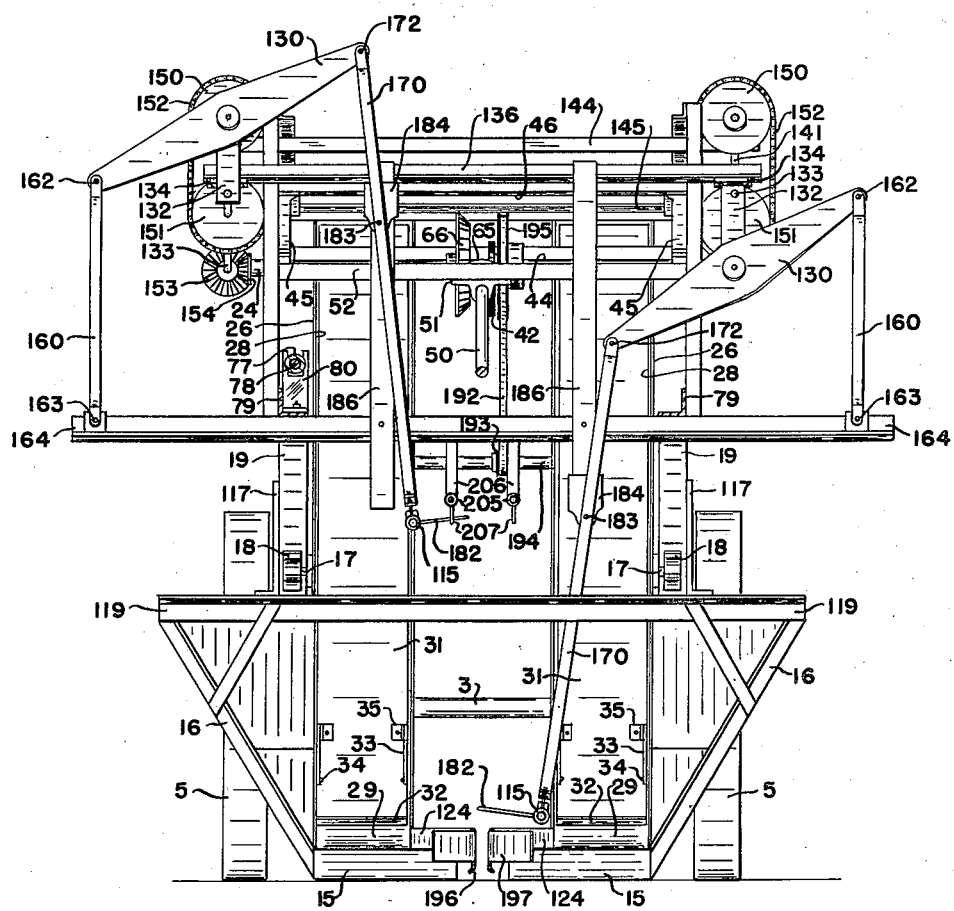
Fig. 2 is a section taken on line 2—2 of Fig. 1.

In Figures 1 and 2, the machine is shown disconnected from the tractor and in a position of repose such as it would occupy when resting on a smooth floor. In operation, the front end of the frame 1 is supported by the tractor as above described. In moving the machine to a bean field along a road or lane, or over a headland between rows of bean plants, the handle 70 is pushed down to raise the entire mechanism well above the ground for convenient transportation. When picking, the handle 70 is pulled up to lower the mechanism to the positions determined by the adjustments of the pins 90, 112 and 120 as described below. In such service position, the main frame 1 is adjusted so that the rakes 115 are tilted upward and forward to such an extent that the front ends of the rakes will contact the bean plants near the uppermost pods and the rear ends of the rakes will contact the bean plants near the lowermost pods. Also, the sub-frame is pivoted within the hanger bearings 18 relative to the main frame 1 so that the pans 15 are in contact with the ground at their rear ends and are tilted a little upward and forward so as not to dig into the ground as the machine is drawn forward. The springs 100 and 107 permit the frame 1 to yield and move upward when the pans 15 encounter any roughness in the ground.

Proper adjustments for the degree to which frame 1 can be lowered will be made by plugging pin 90 in a predetermined aperture 91 of rod 78 and pin 112 in a predetermined aperture 113 of rod 102. Proper tilting of the sub-frame with respect to the main frame 1 is obtained by plugging pins 120, 120 in selected apertures 118, 118 in brackets 117, 117. The motor, not shown, will be started to revolve master shaft 50 which will rotate pinion 65 thereon and bevel gear 66 fixed to turn with shaft 44.

The turning of shaft 44 will revolve sprocket 43 connected to sprocket 40 by sprocket chain 42, whereby to actuate conveyor belts 20, 20 and 121, 121. V-pulley 195 fixed to turn with shaft 44 will rotate V-pulley 193 fixed to turn with shaft 194, whereby to actuate fan 190.

Furthermore, shaft 44 will rotate bevel pinions 154, 154 which mesh with bevel pinions 153, 153 to turn shafts 133 and 141 located in pairs on each side of the machine. Shafts 133, 141 will rotate in unison and in the same direction through the medium of sprockets 150, 151 and sprocket chains 152, 152.

Each pair of shafts 133, 141 will rotate crank arms 132, 140 to actuate yokes 130, 131 in a planetary manner. Links 160, 161 pivoted at their upper ends to one end of yokes 130, 131, respectively and at their lower ends to cross angle irons 164 and 165, will cause yokes 130, 131 to rock on the bearing parts of crank arms 132, 140, whereas links 170 and 171 connected at their upper ends to the opposite end of yokes 130, 131 and at their lower ends to rakes 115, 115, and carrying grooved members 184, 185 that slide on depending bars 186, 187, will cause said rakes 115, 115 to move in an elliptic path, whereby to rake the bean plants, snap off their pods and allow them to fall on conveyor belts 121, 121, where they are pushed off by members 124, 124 onto conveyor belts 20, 20 and then carried towards the rear and upward through chutes 26 aided by sheet 31 and thence out into a bag, not shown, through nozzles 210, 210. Fan 190 will blow the foreign matter out through openings 211, 211.

As the machine moves through the rows of vines, yielding walls 196, 196 will have an easy approach thereto because of the curved outwardly extending tips 197, 197 of walls 196, 196 and because of their tilted position with relation to the ground. Walls 196, 196 will hold the vines from being torn up by their roots, while rakes 115, 115 will comb the pods of beans from said vines.

As the rakes move off they will pass through the strippers 205, 205 to wipe off any vines that are pulled up, whereby to leave the rakes 115, 115 free from foreign matter.

Inasmuch as the pods of beans hang downward and the action of the rakes is upwards, the rakes 115, 115 will snap off the stems of the pods from the vines, without bruising or damaging the bean pods.

The adjustment of pins 90 and 112 will allow for tipping the frame 1 and the rakes 115, 115 at a predetermined angle, whereby the rakes 115, 115 will approach the vines with the front part of said rakes in contact with the upper part of the vines, and the rear part of said rakes in contact with the lower part of the vines. This approach will aid also to prevent rakes 115, 115 from tearing the vines from the ground as explained above.

Figure 15:
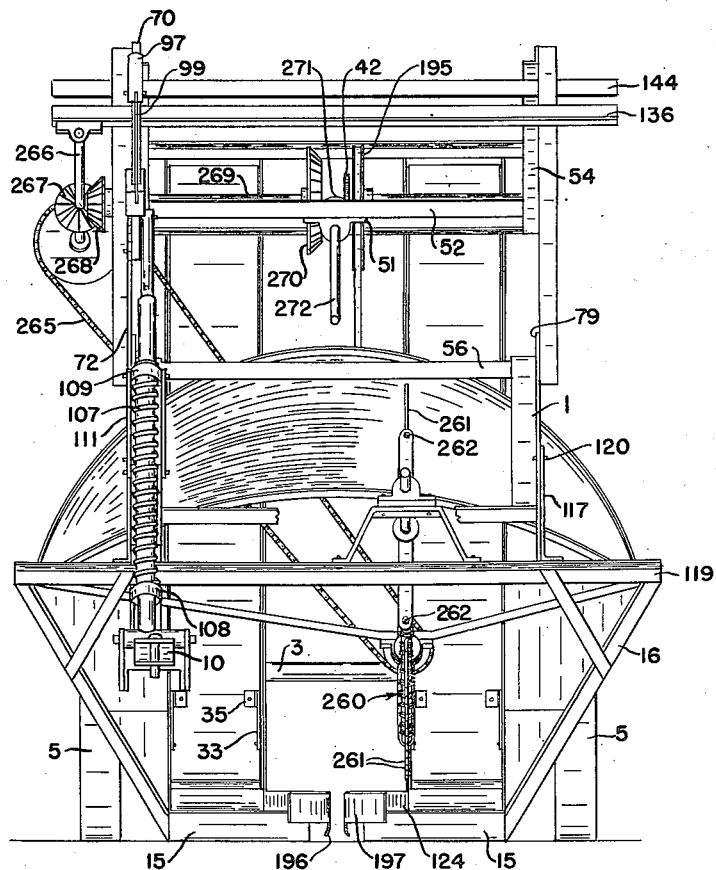
Fig. 15 is a front elevation of the modification shown in Fig. 14, parts being broken away.

Figs. 8 to 13, inclusive, and Figs. 14 and 15, show two modified machines differing from the machine already described primarily in the form of the rakes. The rakes shown in these modifications can be substituted for the rakes 115 on the same framework above described in connection with Figs. 1 to 7, inclusive, with slight changes in the parts of the frame that support the driving mechanism for the rakes. Referring now to Figs. 8 to 13, inclusive, there are shown rakes 220, 220 on either side of the machine. Said rakes 220, 220 embody sleeves 221, 221 which rotate on crank shaft 222 having bearings at 223 and 224 in casings or housings 225 of the machine. Sleeve 221 has an arm 226 connected to bearing 227 which carries pin 228 that projects in the boss part 229 of sliding member 230 with a tight fit. Member 230 slides on shaft 231, whereby to effect the same motion as heretofore described relative to rakes 115.

Figure 9:
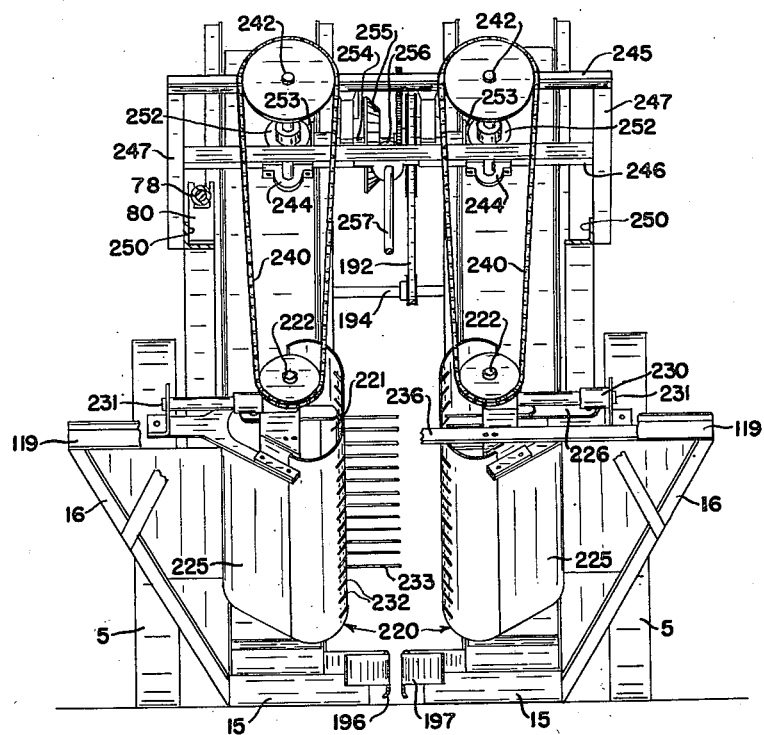
Fig. 9 is a sectional view of the modification shown in Fig. 8, taken on the line 9—9 of Fig. 8.

Slots 232 in casing 225 through which the teeth 233 of rakes 220, 220 project allow for an upward and inward motion of said teeth 233 and also allow the casing 234 adjacent the opening to act as strppers. Each of the casings 225 is held at an inclined angle as shown in Figs. 8 and 9 by angle irons 235 and 236 to angle bar 237 of the frame.

The means for rotating crank arm 222 embodies a sprocket and chain combination 240 with shaft 242 held to turn in bearing straps 243, 244 attached to cross angle irons 245, 246. Angle irons 245 and 246 are welded to angle irons 247 and 248. Angle irons 247 and 248 are welded at their lower ends to frame bar 250 and at their upper ends to frame bar 251.

Shaft 242 has a bevel pinion 252 adapted to turn therewith and meshing with its counter bevel pinion 253 fixed to turn with cross shaft 254 supported in bearings in the frame. Bevel pinion 255 is mounted to turn with shaft 254 and meshes with bevel pinion 256 fixed to turn with power shaft 257.

Figs. 14 and 15 show a still further modification showing a drum rake 260 having a row of teeth or tines 261 at diametrically opposite positions. The teeth 261 comprise wires that are wound around shafts 262, 262. Drum 260 is revolved by a sprocket and chain connection 265 with shaft 266 having a bevel pinion 267 that meshes with bevel 268 mounted to turn with cross shaft 269 which carries a bevel gear 270 meshing with a bevel pinion 271 mounted to turn with power shaft 272.

The machine of Figs. 14 and 15 has only a single drum rake operating on the bean plants from one side of the row, but the arrangement of the drum rake 260 is such that the bean plants may be completely picked from one side. This drum rake machine is particularly useful for the last picking of bean plants that ripen in stages, or for the picking of bean plants of a variety the pods of which ripen substantially all at the same time so as to reqiure only a single picking, since it tines 261, in passing through to the far side of the plants, subject them to a somewhat rougher action that is apt to strip a considerable number of leaves from the plant.

Having thus described my invention, what I claim as new and desire to secure by Letters Patent is as follows:

1. A bean picker adapted to pick whole bean pods direct from bean plants rooted in the ground, comprising in combination a mobile frame adapted to be transported forward along a row of bean plants, a rake mounted on said frame substantially longitudinally thereof for movement with respect to said frame, said rake including longitudinally spaced tines adapted to engage the bean plants from one side thereof in succession as the frame moves forward, means on said frame and operatively connected to said rake for moving said rake relative to said frame in such manner that the tines move in an endless path, said path having a portion adjacent said one side of the plants in which the tines move within and up said bean plants, whereby tines passing under bean pods may sever the pods from the plants at their stems, said rake being so constructed and arranged that the successive tines make initial engagement with each bean plant progressively along the plant from the top down, whereby the pull tending to uproot the plant is minimized, and means for catching the severed bean pods as they fall toward the ground.

2. A bean picker adapted to pick whole bean pods direct from bean plants rooted in the ground, comprising in combination, a substantially horizontally disposed mobile frame adapted to be transported forward along a row of bean plants, a rake mounted on said frame substantially longitudinally thereof for movement with respect to said frame, said rake including longitudinally spaced tines adapted to engage the bean plants from one side thereof in succession as the frame moves forward, means on said frame and operatively connected to said rake for moving said rake relative to said frame in such manner that the tines move in an endless path, said path having a portion adjacent said one side of the plants in which the tines move within and up said bean plants, whereby tines passing under bean pods may sever the pods from the plants at their stems, said rake being inclined upward and forward with respect to said frame so that the successive tines make initial engagement with progressively lower portions of each bean plant, whereby the pull tending to uproot the plant is minimized, and means for catching the severed bean pods as they fall toward the ground.

3. A bean picker adapted to pick whole bean pods direct from bean plants rooted in the ground, comprising in combination, a mobile frame adapted to be transported forward along a row of bean plants, a rotary rake mounted on said frame substantially longitudinally thereof, said rake including longitudinally spaced tines adapted to engage the bean plants from one side thereof in succession as the frame moves forward, means on said frame and operatively connected to said rake for rotating said rake in such direction that the tines move within and up said bean plants, whereby tines passing under bean rods may sever the pods from the plants at their stems, said rake being so constructed and arranged that the successive tines make initial engagement with each bean plant progressively along the plant from the top down, whereby the pull tending to uproot the plant is minimized, and means for catching the severed bean pods as they fall toward the ground.

4. A bean picker adapted to pick whole bean pods direct from bean plants rooted in the ground, comprising in combination, a substantially horizontally disposed mobile frame adapted to be transported forward along a row of bean plants, a rotary rake mounted on said frame substantially longitudinally thereof, said rake including longitudinally spaced tines adapted to engage the bean plants from one side thereof in succession as the frame moves forward, means on said frame and operatively connected to said rake for rotating said rake in such direction that the tines move within and up said bean plants, whereby tines passing under bean pods may sever the pods from the plants at their stems, said rake being inclined upward and forward with respect to said frame so that the successive tines make initial engagement with progressively lower portions of each bean plant, whereby the pull tending to uproot the plant is minimized, and means for catching the severed bean pods as they fall toward the ground.

5. A bean picker adapted to pick whole bean pods direct from bean plants rooted in the ground, comprising in combination, a mobile frame adapted to be transported forward along a row of bean plants, a pair of rakes mounted on opposite sides of said frame substantially longitudinally thereof for movement with respect to said frame, each of said rakes including longitudinally spaced tines adapted to engage the bean plants from one side thereof in succession as the frame moves forward, means on said frame and operatively connected to said rakes for moving said rakes relative to said frame in such manner that the tines move in an endless path, said path having a portion adjacent said one side of the plants in which the tines move within and up said bean plants, whereby tines passing under bean pods may sever the pods from the plants at their stems, said rakes being so constructed and arranged that the successive tines make initial engagement with each bean plant progressively along the plant, from the top down, whereby the pull tending to uproot the plant is minimized, and means for catching the severed bean pods as they fall toward the ground.

6. A bean picker adapted to pick whole bean pods direct from bean plants rooted in the ground, comprising in combination, a substantially horizontally disposed mobile frame adapted to be transported forward along a row of bean plants, a pair of rakes mounted on opposite sides of said frame substantially longitudinally thereof for movement with respect to said frame, each of said rakes including longitudinally spaced tines adapted to engage the bean plants from one side thereof in succession as the frame moves forward, means on said frame and operatively connected to said rakes for moving said rakes relative to said frame in such manner that the tines move in an endless path, said path having a portion adjacent said one side of the plants in which the tines move within and up said bean plants, whereby tines passing under bean pods may sever the pods from the plants at their stems, said rakes being inclined upward and forward with respect to said frame so that the successive tines make initial engagement with progressively lower portions of each bean plant, whereby the pull tending to uproot the plant is minimized, and means for catching the severed bean pods as they fall toward the ground.

LEILA B. S. WARD.

REFERENCES CITED

The following references are of record in the file of this patent:

UNITED STATES PATENTS

| Number | Name | Date |
|---|---|---|
| 371,372 | Savage | Oct. 11, 1887 |
| 637,281 | Pence | Nov. 21, 1899 |
| 1,304,797 | Murphy | May 27, 1919 |
| 1,401,829 | Swindell | Dec. 27, 1921 |
| 1,449,869 | Novak | Mar. 27, 1923 |
| 1,664,924 | Helton | Apr. 3, 1928 |
| 1,727,431 | Herr | Sept. 10, 1929 |
| 2,204,115 | Armstrong | June 11, 1940 |
| 2,466,089 | Esch | Apr. 5, 1949 |